Patented Aug. 9, 1938

2,126,456

UNITED STATES PATENT OFFICE 2,126,456

PROCESS FOR THE PREPARATION OF INDANTHRONE COMPOUNDS

William Dettwyler, Milwaukee, Wis., assignor to E. I. du Pont de Nemours & Company, Wilmington, Del., a corporation of Delaware No Drawing. Application July 22, 1936, Serial No. 91,918

6 Claims. (Cl. 260—31)

This invention relates to a new and improved process for the preparation of indanthrone compounds and more particularly to an improvement in the process for effecting the condensation of 1-halogen-2-aminoanthraquinones.

It is well known that 1:3-dibromo-2-aminoanthraquinone and 1-bromo-3-chloro-2-aminoanthraquinone will condense with themselves on heating in an inert solvent in the presence of a copper catalyst and an acid binding agent to give 3:3'-dibromo-, or 3:3'-dichloroindanthrone respectively. It has long been known that 1:3-dichloro-2-aminoanthraquinone could not be so condensed to give 3:3'-dichloroindanthrone, due apparently to the fact that the alpha chlorine could not be split off as readily as bromine. It has recently been found, however, that by aid of special catalysts 1-chloro-2-aminoanthraquinone compounds could be condensed to indanthrone. (See, for instance, U. S. 2,030,876 and 2,030,877.)

I have found that 1-chloro-2-aminoanthraquinone compounds including 1:3-dichloro-2-aminoanthraquinone can be condensed to give the corresponding indanthrone in a much higher yield than that obtained by the disclosure above mentioned if a copper halide is used to facilitate the reaction which has been prepared by special methods. I have also found that in the condensation of 1-chloro-2-aminoanthraquinones with the special catalyst much smaller quantities of acid binding agents such as sodium carbonate may be used. I have further found that the indanthrone condensation may be carried out directly in the organic solvent in which the new catalyst is prepared without isolating the same, thereby facilitating the preparation of the product on a commercial scale.

According to the present invention cuprous bromide, cuprous iodide, or cuprous chloride in a very fine granular form, obtainable by the direct combination of halogen and copper in an organic solvent, is suspended in an organic solvent with sodium carbonate. The 1-chloro-2-aminoanthraquinone is then added to the mixture and the mass is heated to reaction temperature until condensation is complete. The corresponding indanthrone is obtained in materially increased yields over that heretofore obtainable.

To more fully illustrate the invention the following examples are given in which the parts used are by weight:

Example 1

To a suspension of 20 parts copper powder in 500 parts orthodichlorobenzene 30 parts of bromine are added. The mass is heated slowly to 175° C. The coppery color changes to a black and finally to a gray. Hydrobromic acid is liberated and is carried off by passing a stream of dry air or other inert gas such as nitrogen over the surface of the liquid.

When practically all hydrobromic acid is removed, 100 parts 1:3-dichloro-2-aminoanthraquinone and 20 parts of soda ash are added. The temperature is maintained at about 175° for 20 hours and the hot mass is poured into 1000 parts of cold water and then steam distilled until free from solvent. 300 parts 30% hydrochloric acid are then added and the mass is filtered, washed acid-free, and dried. The so-obtained crude color may be purified by fractional crystallization from sulfuric acid to give high yields of 3:3'-dichloroindanthrone.

Example 2

A mixture of 100 parts 1:3-dichloro-2-aminoanthraquinone, 20 parts soda ash and 500 parts orthodichlorobenzene are heated to 175° C. and when all water is driven off, 46 parts of specially prepared copper bromide (prepared by direct combination of copper powder and bromine in an organic solvent) are added. The mass is held at 175° for 20 hours and worked up as in Example 1. A yield of 3:3'-dichloro indanthrone is obtained equal to that heretofore obtainable from 1-bromo-2-amino-3-chloroanthraquinone.

Example 3

In 400 parts nitrobenzene 20 parts of copper powder are suspended and 30 parts of bromine are added. The mass is heated to 170–180° carrying off all hydrobromic acid formed with a dry air current. 100 parts 1:3-dichloro-2-aminoanthraquinone and 20 parts soda ash are then added and the temperature is raised to 205–210° and held for 3 to 4 hours. The mass is poured into 1000 parts cold water and the solvent is removed with steam. The pure color is isolated as in Example 1.

Example 4

100 parts 1:3-dichloro-2-aminoanthraquinone in 500 parts orthodichlorobenzene are heated with 20 parts soda ash to 170° and 31 parts of freshly prepared cuprous chloride (prepared as described above, see also copending application Ser. No. 91,917) are added. The mass is refluxed for 20 hours and the solvent is removed by steam distillation.

The condensation of the 1-halogen-2-aminoanthraquinones in the presence of these improved copper halides is preferably carried out at temperatures of from 150° to 210° C.

While it appears that the cuprous halide operates as a catalyst in this reaction, theoretical quantities are apparently made necessary due to the fact that the catalytic effect is impaired or rendered nil when once it has operated to extract the halogen from the alpha-chloroanthraquinone body. It has apparently been due to the fact that the cuprous compounds heretofore employed in this condensation have not been sufficiently active to facilitate the elimination of HCl from the chloroanthraquinones that only traces of indanthrone compounds could be prepared therefrom. I have found that by the use of these improved cuprous halides that not only will the reaction proceed but that high yields of a relatively pure product are obtained.

What I claim is:

1. In the process for preparing indanthrone compounds wherein a 1-chloro-2-aminoanthraquinone is heated in an inert organic solvent in the presence of a copper catalyst and an acid binding agent, the step which comprises carrying out the reaction in the presence of a cuprous halide prepared by direct union of finely divided copper and a halogen in an organic solvent.

2. In the process for preparing indanthrone compounds wherein a 1-chloro-2-aminoanthraquinone is heated in an inert organic solvent in the presence of a copper catalyst and an acid binding agent, the step which comprises carrying out the reaction in the presence of a cuprous halide prepared by direct union of finely divided copper and a halogen in an organic solvent, the condensation being carried out in the same solvent in which the cuprous halide was prepared.

3. In the process for preparing indanthrone compounds wherein a 1-chloro-2-aminoanthraquinone is heated in an inert organic solvent in the presence of a copper catalyst and an acid binding agent, the step which comprises carrying out the reaction in the presence of a cuprous halide prepared by direct union of finely divided copper and a halogen in an organic solvent, the condensation being carried out in the same solvent in which the cuprous halide was prepared without isolating the cuprous halide.

4. In the process for preparing indanthrone compounds wherein a 1-chloro-2-aminoanthraquinone is heated in an inert organic solvent in the presence of a copper catalyst and an acid binding agent, the step which comprises carrying out the reaction in the presence of cuprous bromide prepared by direct union of finely divided copper and bromine in an organic solvent.

5. In the process for preparing indanthrone compounds wherein a 1-chloro-2-aminoanthraquinone is heated in an inert organic solvent in the presence of a copper catalyst and an acid binding agent, the step which comprises carrying out the reaction in the presence of cuprous chloride prepared by direct union of finely divided copper and chlorine in an organic solvent.

6. In the process for preparing indanthrone compounds wherein a 1-chloro-2-aminoanthraquinone is heated in an inert organic solvent in the presence of a copper catalyst and an acid binding agent, the step which comprises carrying out the reaction in the presence of cuprous iodide prepared by direct union of finely divided copper and iodine in an organic solvent.

WILLIAM DETTWYLER.